(12) United States Patent
Schumacher et al.

(10) Patent No.: US 8,590,945 B2
(45) Date of Patent: Nov. 26, 2013

(54) DOUBLE-KNOT TWINE-KNOTTER UNIT FOR LARGE BALE PRESSES WITH A PLURALITY OF DOUBLE-KNOT TWINE-KNOTTERS ASSEMBLED ON ONE KNOTTER DRIVESHAFT

(75) Inventors: Friedrich Wilhelm Schumacher, Birnbach (DE); Heinz-Guenter Schumacher, Eichelhardt (DE); Andreas Acimas, Solingen (DE); Michael Flanhardt, Langenfeld (DE)

(73) Assignee: Rasspe Systemtechnik Gmbh & Co., KG, Wermelskirchen (DE)

( * ) Notice: Subject to any disclaimer, the term of this patent is extended or adjusted under 35 U.S.C. 154(b) by 26 days.

(21) Appl. No.: 13/504,395

(22) PCT Filed: Nov. 3, 2009

(86) PCT No.: PCT/EP2009/007863
§ 371 (c)(1),
(2), (4) Date: Apr. 26, 2012

(87) PCT Pub. No.: WO2011/054360
PCT Pub. Date: May 12, 2011

(65) Prior Publication Data
US 2012/0211979 A1    Aug. 23, 2012

(51) Int. Cl.
*B65H 69/04* (2006.01)
(52) U.S. Cl.
USPC ............................................................ 289/2
(58) Field of Classification Search
USPC ............... 289/2, 10, 13, 15, 16; 100/8, 20, 29
See application file for complete search history.

(56) References Cited

U.S. PATENT DOCUMENTS

| | | | | |
|---|---|---|---|---|
| 2,926,599 A * | 3/1960 | McClellan | ...................... | 100/22 |
| 4,022,121 A | 5/1977 | Crawford et al. | | |
| 4,157,063 A * | 6/1979 | Minke | ................. | 100/3 |
| 4,351,551 A * | 9/1982 | Verhulst | ............................ | 289/2 |
| 4,735,446 A * | 4/1988 | Homberg | ........................... | 289/2 |
| 5,829,346 A * | 11/1998 | Ast | ............................. | 100/19 R |
| 6,349,636 B1* | 2/2002 | Hawlas | ............................ | 100/2 |
| 6,957,835 B2* | 10/2005 | Rotole | ................. | 289/2 |
| 7,287,782 B2* | 10/2007 | Naeyaert | ........................ | 289/2 |
| 7,296,828 B2* | 11/2007 | Schoonheere et al. | ............ | 289/2 |
| 7,600,470 B2* | 10/2009 | Eylenbosch | ................ | 100/33 R |
| 7,878,557 B2* | 2/2011 | Eylenbosch et al. | ............. | 289/5 |
| 2006/0108806 A1* | 5/2006 | Naeyaert | ........................... | 289/2 |
| 2009/0044710 A1* | 2/2009 | Eylenbosch | ................ | 100/19 R |

FOREIGN PATENT DOCUMENTS

| | | |
|---|---|---|
| DE | 19819595 | 11/1999 |
| DE | 20016238 | 2/2002 |
| EP | 1532859 | 5/2005 |

* cited by examiner

*Primary Examiner* — Shaun R Hurley
(74) *Attorney, Agent, or Firm* — Fay Sharpe LLP

(57) ABSTRACT

A double-knot twine-knotter unit with twine tying having a plurality of double-knot twine knotters combined on one knotter drive shaft. Each double-knot twine knotter comprises at least one knotter drive disc, a knotter chassis, a knotter assembly and a blade lever. The knotter drive disc is fastened fixedly on the knotter drive shaft which can be driven about its axis. The knotter chassis carries a knotter assembly, which forms two knots following one another, and the blade lever which is driven by a cam track of the knotter drive disc. The knotter assembly is arranged so as to overlap in the axial direction of the knotter drive shaft with the knotter drive disc of the adjacent double-knot twine knotter on a part length of the knotter assembly.

20 Claims, 5 Drawing Sheets

DOUBLE-KNOT TWINE-KNOTTER UNIT FOR LARGE BALE PRESSES WITH A PLURALITY OF DOUBLE-KNOT TWINE-KNOTTERS ASSEMBLED ON ONE KNOTTER DRIVESHAFT

FIELD OF THE INVENTION

The invention relates to a double-knot twine-knotter unit particularly for large bale presses with twine tying, with a plurality of double-knot twine-knotters assembled on one knotter driveshaft. Thus each of the double-knot twine-knotters is provided with a knotter drive disk, secured torque proof on the knotter driveshaft, which is driven about its axis, and with a knotter chassis assigned to the knotter drive disk. The knotter chassis is held fixed in space, at one end with respect to the bale press channel, and at the other end with respect to the knot driveshaft, and carries a knotter module forming two knots, one following another, and also a blade lever driven from a cam track of the knotter drive disk. The knotter modules comprise at least: one twine holder driven from a first toothed drive segment of the knotter drive disk, and one knot hook driven from a second toothed drive segment of the knotter drive disk. The blade lever has a threefold function, in that it serves firstly to guide the twine, secondly to part the twine, and thirdly to strip the twine loops from the knot hook.

BACKGROUND OF THE INVENTION

Double-knot twine-knotters or twine-binders are predominantly deployed in large mobile rectangular bale presses for straw, hay, silage and similar materials, and also in the recycling of materials, e.g. for the bundling of paper, textiles, thin sheets, and similar.

Tying or bundling equipment fitted with such knotters can, however, also be components of packaging plants for the restraint of packs, bales, or bundles made up of suitable materials.

In large stationary or mobile bale presses the material to be baled is loaded into a bale press channel that is at least rectangular in cross-section, usually pre-compressed, and is pressed into a continuous rectangular body of material. The latter is divided into cube-shaped bales—also commonly designated as square bales—whose upper and lower faces, and also their outer faces in the longitudinal direction of the bale press channel, are strapped with a plurality of twine strands, which are knotted before the bale is ejected.

The supply of the necessary twine, the knotting process within the knotter and also the contribution of the bale press elements that take part in the formation of a double knot, are described in the document DE-27 59 976 C1 Hesston (also published as U.S. Pat. No. 4,074,623), which forms the starting point for the invention, and whose content contributes to the subject matter of the present disclosure, and which reference is incorporated herein by reference.

In the Rasspe company document "Twine-knotters for bale presses" recorded and distributed on a CD in 2002 at the time of the company's 175th anniversary, and whose content also contributes to the subject matter of the present disclosure, not only the general mode of operation of a twine-knotter, but also the differences between single and double-knotting, are presented in all their details.

Depending on the width of the bale and its density of compression, two or a plurality of double-knot twine-knotters are mounted next to one another on the knotter driveshaft of a bale press. The choice of knotters and bale press elements supporting the knotting process are determined by the number of turns required around the bale.

The knotter driveshaft is located either above or below the bale press channel, which is usually arranged horizontally, and as a rule is arranged parallel to the latter; in other bale press channels the driveshaft is arranged at the side.

The economic efficiency, e.g. of the recovery of straw feed, depends on the recovery, freight and storage costs. Straw, particularly in its chopped form, is used as litter in poultry barns, dairy cattle cubicles, and other types of stalls. It serves furthermore as a feedstuff in feed rations that are low in roughage, as a ground cover in strawberry cultivation, and as a culture medium for the growing of mushrooms. In order to enable such applications the large bale presses are fitted at the front with cutters or chopping devices. As a rule, pre-compression of the material takes place in a feeder channel that is mounted upstream of the main bale press channel; the material is only forwarded to the main bale press channel when a predefined quantity with a defined compression density is available. With such precautions highly compressed bales of high weight are generated.

Since the mobile bale presses are no longer just moved from one field to another, but are also deployed between farms, they must be suitable for travelling on roads, that is to say, they must satisfy the German Road Traffic Licensing Regulations. From this it follows that the dimensions of the machinery cannot be increased in an unlimited manner. Also the dimensions of the individual bales must be suitable for optimal loading onto trucks and subsequent storage.

In order to increase the weight of the bale even further, as a result of which the available transport capacity can be utilised better than before, and the content of a bale is increased, an increase of the compression of a bale is sought whilst maintaining a comparable level of moisture in the material. With such an objective, however, it must be borne in mind that the plastic twines that are available at the present time are predominantly polypropylene twines that have a limited tear resistance; with an increased density of the compressed material they would tear when the bales are ejected out of the bale press channel. The thickness of the baling twine, which is determined in terms of the length of the twine strand, expressed as how many metres of twine weigh one kilogram (unit: m/kg), cannot be increased without further measures being taken, on the one hand because the individual knotter components are designed to process the baling twines that are on the market, while on the other hand, thicker twines with increased tear resistance would disadvantageously increase the dimensions of the double-knotter, wherein it is uncertain whether reliable functioning of the knotter in accordance with the so-called Deering operating principle could be achieved at all. With increasing twine thickness the knot strength represents a further problem.

In order to avoid failures, therefore, the force required to hold a bale together must be distributed over more twine strands than have previously been achievable. If the distance between the individual twine strands is less than previously prescribed by the width of the twine double-knotter, this also has an advantageous effect on the cohesion of a bale consisting of finely chopped straw.

In order to increase the weight of a straw bale—assuming the same dimensions and the same moisture level—e.g. by 25%, a large bale press of the generic kind, which was previously fitted with 6 double-knot twine-knotters in accordance with Hesston, would have to be equipped with 8 knotters, but with the length of the knotter driveshaft unaltered. The double-knot twine-knotter of the generic kind described in the document DE-27 59 976 C1 (Hesston) consists of a drive device, in what follows also denoted as a "drive module", a frame, in what follows also denoted as a "knotter chassis", and also a knotter module and a blade lever, and requires sufficient distance from the adjacent double-knot twine-knotter such that the drive arm of the blade lever, articulated on the frame, whose lower end opens out into a bifurcation, does not impact on the adjacent double-knot twine-knotter, if it moves into its outer deadpoint position.

SUMMARY OF THE INVENTION

The object underlying the invention is that of configuring a double-knot twine-knotter unit of the generic kind particularly for a large bale press with twine tying such that the effective build width of the individual double-knot twine-knotters is reduced whilst maintaining the double-knot operating principle of known art, such that a knotter driveshaft for a multiplicity of double-knot twine-knotters can be fitted with more double-knot twine-knotters than previously.

To fulfil this task a double-knot twine-knotter unit in accordance with the present invention is proposed. Thus in a double-knot twine-knotter unit of the generic kind, or a double-knot twine-knotter of the generic kind, provision is made that the knotter module is arranged with an overall axial offset with respect to the hub of the knotter drive disk and the driveshaft-side end of the knotter chassis. The knotter module in question, and, if applicable, the pivoting region of the blade lever also, overlaps in the axial direction of the knotter driveshaft with the knotter drive disk of the adjacent double-knot twine-knotter by a sub-length of the knotter module and, if applicable, by a sub-length of the pivoting lever of the blade region also. In this manner a certain dimensional decoupling occurs between the dimensional requirements placed on the hub of the knotter drive disk and the driveshaft-side attachment of the knotter chassis, and the arrangement and embodiment of the knotter module and the blade lever. Not insignificant sections of the lengths of the right-hand and/or left-hand adjacent double-knot twine-knotters thus overlap with the double-knot twine-knotter that is located in between. In this manner the effective length of a double-knot twine-knotter can be shortened with respect to the knotter driveshaft, to the extent that is permitted by the drive module, or the knotter module, or the blade lever, wherein the effective length of the double-knot twine-knotter is determined by whichever of the three modules has the greatest length with respect to the knotter driveshaft. The overlap can amount to between 5 and 30 mm, or more. By means of the invention a reduction of the effective build width of a double-knot twine-knotter, including the knotter components that pivot with respect to the knotter chassis when the knotter is in operation, by 40 to 50 mm, or more, becomes possible. Here the term "effective build width" in the context of the invention is understood to mean the overall minimum driveshaft sub-length required for a double-knot twine-knotter in the assembled state of a plurality of double-knot twine-knotters. The invention is realised even if just one or a few of the double-knot twine-knotters of the unit have the offset. Preferably as many double-knot twine-knotters of a unit as possible have this offset. By the same token it is now, as before, possible within the context of the invention to arrange the double-knot twine-knotters with an axial separation distance relative to one another on the knotter driveshaft. However, such separation distances are preferably kept small, or are avoided altogether. Thus with an appropriate configuration of the four modules (drive module, knotter module, blade lever, and knotter chassis), the effective build width of a double-knot twine-knotter can be reduced by means of the invention very significantly, wherein particularly preferred opportunities arise for this purpose from what follows.

In accordance with a first form of embodiment of the invention the configuration of the blade lever is modified, compared with that for double-knot twine-knotters of forms of embodiment of previously known art, so that that during its pivoting action any impact on components of adjacent knotters is avoided. For this purpose provision can be made that the pivot arm of the blade lever, which at its lower end has a bifurcation with a plurality of twine guidance regions for the twine strands to be knotted, a stripper and a twine blade for purposes of parting the finished knots from the twine strands, is straight. It can extend parallel or approximately parallel to the plane of the knotter drive disk, when it is located in its non-pivoted (first) deadpoint position. Its cross-section is preferably polygonal and in particular rectangular with, if applicable, rounded corners. In contrast, the pivot arms of known art of the blade levers of both single knot twine-knotters (DE 20 57 291 C3), and also of double-knot twine-knotters (DE 27 59 976 C1) are embodied in a highly curved manner, and are provided with ribs.

In accordance with the invention at least one sub-length of one leg of the pivot arm of the blade lever is straight. Preferably two straight sub-length sections are provided, of which one is located nearer to the point of rotation or pivot of the blade lever on the knotter chassis and the other is located nearer to the free working end of the pivot arm. Between the two sub-lengths a short cranked section of the pivot arm can be provided such that the sub-length nearer to the point of rotation in the non-pivoted deadpoint position extends near the chassis-side end face of the knotter drive disk, and the sub-length further away from the point of rotation extends radially outwards with respect to the knotter drive disk and leaves the rotation region of the knotter hook free. The sub-length further away from the point of rotation can be angled with respect to the sub-length nearer the point of rotation in the direction towards the related knotter disk. This angle can be between 1 and 30°, preferably between 1 and 10°, and particularly preferably between 2 and 8°. The articulation region of the pivot arm of the blade lever on the chassis-side point of rotation, which also carries the drive lever moved by the knotter drive disk, can assume a distinct angular orientation with respect to the at least one straight sub-length of the pivot arm of the blade lever, in particular of the order of between 30 and 60°.

The pivot arm of the blade lever can be straight at right angles to the plane of the knotter drive disk, and, in contrast to the blade lever arms of known art from the above-cited documents, does not have to be curved or ribbed, so that the space requirement for the pivotal movement is minimised. The working region of the blade lever with its bifurcation for a plurality of twine guidance regions, its stripper, and its twine blade, can be attached to the pivot arm in the form of an L-leg, so that swept-out zones of this working region are dispensed with. Inasmuch as the second fork arm of the twine guidance regions is to be embodied in a longer form than the short L-leg, this fork arm, as viewed parallel to the driveshaft, is curved in a manner corresponding to the L-shape and thus does not demand any further pivotal space. Also, as viewed parallel to the drive disk, the drive region is preferably attached as an L-leg to the pivot arm of the blade lever.

The blade lever, which is subject to high dynamic loads, can consist of a material whose tensile strength is significantly greater than that of conventional levers. The regions of the lever that are particularly subject to wear, such as twine guides or roller bearings, can advantageously be partially hardened, if a heat-treatable steel alloy is introduced.—All the special features of the blade lever referred to above are independently of independent inventive significance for double-knot twine-knotters of the generic kind.

While the knotter hook as usual is located near to the knotter drive disk, the twine holder extends from the knotter drive disk on the side positioned further away from the knotter hook in the axial direction of the knotter driveshaft. The axial build length of the knotter module, consisting at least of the knotter hook and the twine holder, can advantageously be axially bounded by the knotter drive disk at the furthermost point of the twine holder. This region of the knotter module reaches completely or partially under the knotter drive disk of the adjacent double-knot twine-knotter and overlaps with the latter, so that by this means the effective build width of the double-knot twine-knotter in the axial direction is kept low. Such an arrangement of the twine holder is advantageously aided if the knotter chassis, viewed transverse to the knotter driveshaft, comprises an L-shaped carrier arm, which, as viewed transverse to the end face of the knotter drive disk, with respect to the blade lever extends radially outwards from the driveshaft. A 90°-gearbox, which as usual moves the twine holder, can be integrated in the region of the legs of the knotter chassis that are adjacent to one another, with low contamination levels, wherein the gearbox housing can also accommodate the forces resulting from the twine holding process.

The length of the shorter L-leg of the blade lever can be less than the length of the shorter L-leg of the knotter chassis, so that even when the blade lever is pivoted outwards from the drive disk to the maximum extent, i.e. in its stripping position, the blade lever does not project axially beyond the knotter chassis and/or the twine holder. However, such a projection with appropriate forms of embodiment of the working region of the blade lever is fundamentally possible and does not impair the build length reduction of the double-knotter twine-knotter, since the working region of the blade lever can also in an advantageous manner at least partially overlap with the adjacent drive disk. The longer L-legs of the knotter chassis and the blade lever set free between each other in a manner of known art the space requirement for the knotter hook and the twine holder by virtue of their radial paths between them. The blade lever, L-shaped in two planes, encompasses the knotter hook in all pivotal positions.

The axial lengths of the knotter module and the hub of the knotter drive disk and the driveshaft-end of the knotter chassis can also be configured independently of one another and thus advantageously. In the case of the hub a reduction of its axial length can e.g. be undertaken in comparison with the design of known art from DE 297 19 715 U1. In particular a hub-type extension on the side of the knotter drive disk facing away from the knotter chassis, as is described in DD 279 161 A5, can be dispensed with. One of the plurality of intermediate bearings of the knotter driveshaft, in addition to the two end bearings of this shaft, can be replaced in that one or a plurality of the knotter chassis are rigidly connected with the press frame. This prevents the knotter driveshaft, fitted with a plurality of knotters, from flexing as it rotates. This connection can be undertaken by means of a web on the knotter chassis, which is bolted onto a matching counterpart on the press frame. Alternatively a web, which is rigidly connected with a cover of the knotter chassis by being cast on or bolted on, can be present for purposes of attachment.

The cam guiding the blade lever on the knotter drive disk, which takes part in the formation of the first knot, can be radially offset back by approx. 5°. This measure ensures that the press needle assigned to the respective knotter does not come into contact with its blade lever. As described in the document DE-20 2005 011 458, the press needle, when its upper region moves through the knotter, can be fixed on the movement path of the needle by a guide roller underneath the knotter hook driveshaft. The offset of the above-mentioned cam on the knotter drive disk has an advantageous effect on the knot structure, in that appreciable longer knot ends than previously usual are formed, as a result of which any release of the knot under tensile stress is effectively prevented. This feature is of independent inventive significance.

Since in contrast to single-knotters the double-knotter allows two knots to be formed during one rotation of the knotter drive disk, the knotter hook must also rotate twice. Here it is essential that the hook aperture, which is formed from a head and a tongue of the knotter hook, suddenly closes after the withdrawal of the first knot, in order that the roller at the rear end of the tongue for the formation of the second knot can again pass reliably under the closer. In order that the aperture of the knotter hook closes quickly and reliably, the knotter tongue is additionally loaded by a spring and a pin, which are arranged in the shaft of the knotter hook, as is of known art e.g. from DE-201 10 162 U1. The closer itself exerts pressure onto the roller at the rear end of the tongue of the knotter hook, in that it is retracted, via a pin, by a compression spring arranged underneath its knotter frame support. The compression or flat springs, located externally, that are otherwise usual in this design of knotter, would be unhelpful to the desired reduction of the build width of a double-knotter.

The components cited above, and described in the examples of embodiment, to be used in accordance with the invention, in their size, configuration, selection of materials and technical design are not subject to any particular exceptional conditions, so that the selection criteria of known art in the field of application can find unrestricted application.

Further details, features and advantages of the subject of the invention ensue from the following description and the related drawing, in which—in an exemplary manner—an example of embodiment of a double-knot twine-knotter unit for a large bale press with twine tying with a multiplicity of double-knot twine-knotters is represented. Also individual features of the forms of the embodiments can be combined with other features of other forms of the embodiments.

One embodiment of the present invention is directed to a double-knot twine-knotter unit for a large bale press with twine tying with a plurality of double-knot twine-knotters assembled on one knotter driveshaft. Each double-knot twine-knotter includes at least one knotter drive disk, one knotter chassis, one knotter module and one blade lever. The knotter drive disk is attached torque proof on the knotter driveshaft, which can be driven about its axis. The knotter chassis is assigned to the knotter drive disk such that the knotter chassis is held fixed in space, at one end with respect to a bale press channel, and at the other end by the knotter driveshaft. The knotter chassis carries a knotter module forming two knots, one following another, and also the blade lever, which is driven by a cam track of the knotter drive disk. The knotter module comprises at least one twine holder driven from a first toothed drive segment of the knotter drive disk, and also one knotter hook driven from a second toothed drive segment of the knotter drive disk. The knotter module is arranged overall axially offset with respect to the hub of the knotter drive disk and the driveshaft side end of the knotter chassis, and the knotter module is arranged overlapping on a sub-length of the knotter module with the knotter drive disk of the adjacent double-knot twine-knotter in the axial direction of the knotter driveshaft. In one non-limiting optional embodiment of the invention, the width of the knotter module is defined by the point of the twine holder axially furthermost from the knotter drive disk. In another and/or alternative non-limiting optional embodiment of the invention, one arm of a carrier arm of the knotter chassis projects in the axial direction of the knotter driveshaft beyond the hub of the knotter drive disk and the driveshaft-side end of the knotter chassis, and is arranged overlapping on a sub-length of the knotter chassis with the build length of the knotter drive disk of the immediately adjacent double-knot twine-knotter. In another and/or alternative non-limiting optional embodiment of the invention, a gearbox for the actuation of the twine holder is integrated in the form of a housing into an L-shaped carrier arm of the knotter chassis. In another and/or alternative non-limiting optional embodiment of the invention, the pivot arm of the blade lever is straight. In another and/or alternative non-limiting optional embodiment of the invention, the pivot arm is arranged parallel or approximately parallel to the knotter drive disk, when it is located in its rest-deadpoint position. In another and/or alternative non-limiting optional embodiment of the invention, the cross-section of the pivot arm of the blade lever has a polygonal or rectangular cross-section. In another and/or alternative non-limiting optional embodiment of the invention, the pivot arm of the blade lever has two straight sub-length regions. In another and/or alternative non-limiting optional embodiment of the invention, the pivot arm of the blade lever has a cranked section. In another and/or alternative non-limiting optional embodiment of the invention, the pivot arm of the blade lever is angled by 1 to 30°. In another and/or alternative non-limiting optional embodiment of the invention, the blade lever, having a pivot arm and a working region, is configured in an L-shape, as viewed in the direction of its pivot shaft. In another and/or alternative non-limiting optional embodiment of the invention, the blade lever, having a pivot arm and a working region, is configured in an L-shape, as viewed in the direction parallel to the knotter driveshaft. In another and/or alternative non-limiting optional embodiment of the invention, at least one of the rotational or pivotal bearings is provided near to or on the ends of the bearing with sealing rings between hub and shaft, and the chamber that exists as a result of the bearing clearance provided between the sealing rings of a bearing is a lubricant chamber tilled with lubricant.

DETAILED DESCRIPTION OF EXAMPLES OF EMBODIMENT

Figure 1:
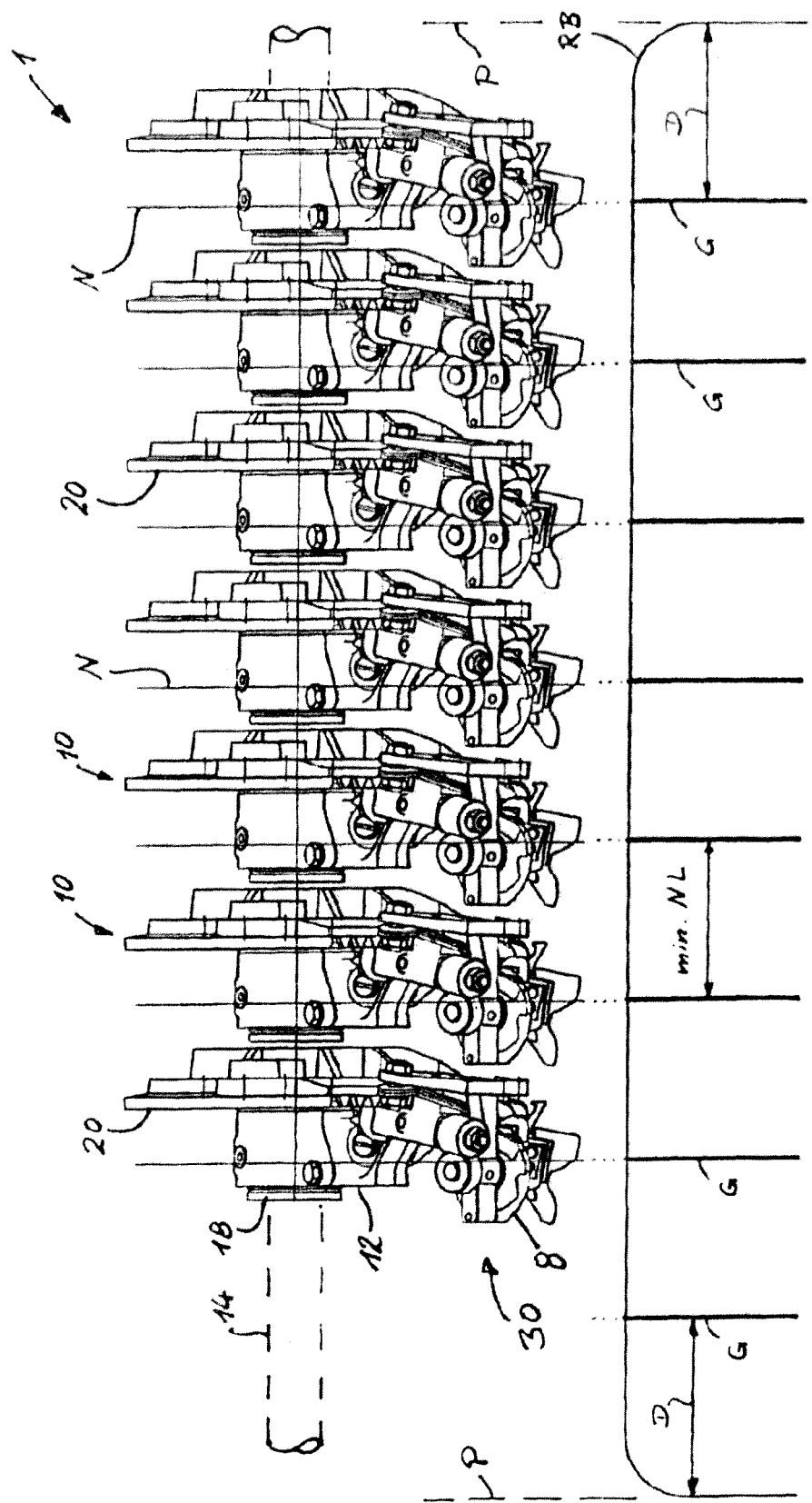
FIG. 1 shows a double-knot twine-knotter unit for large bale presses with twine tying with seven double-knot twine-knotters assembled on one knotter driveshaft, in a side view as viewed from the side opposite to the blade lever, approximately corresponding to the view C-C in FIG. 3.

In FIG. 1 can be seen a double-knot twine-knotter unit for large bale presses with twine tying for eight double-knot twine-knotters 10 arranged on one knotter driveshaft 14, of which in the interests of clarity the eighth (left-hand) knotter has been omitted, and in which the straw pressed out parallel to one edge of a rectangular bale RB is arranged in a bale press channel P of a large bale press in a manner of known art. At right-angles to the knotter driveshaft the needle movement planes N and thus also the twine loops G run around the rectangular bales RB; these run parallel to one another at the minimum separation distance (NL) of the double-knot twine-knotters 10. The edge separation distances D to the lateral bale diamonds are preferably 120 to 160 mm.

Each double-knot twine-knotter 10 comprises at least: one knotter drive disk 20, which by means of its hub 18 (FIG. 3) is connected torque proof with the knotter driveshaft 14, and furthermore one knotter chassis 12, one knotter module 30 and one blade lever 4. The knotter chassis 12 is assigned to the knotter drive disk 20 such that the knotter chassis 12, e.g. by means of an attachment eye 12B (see FIG. 3), is held fixed in space with respect to a bale press channel P. On the other side the knotter chassis 12 is held fixed in space by the knotter driveshaft 14. This can be achieved in that the hub 18, with which the knotter drive disk 20 is connected torque proof, accommodates a rotational bearing of the knotter chassis 12 on a hub region projecting from the knotter drive disk 20. A bearing half shell 12C, which can be released from the rest of the knotter chassis 12, can be seen in FIG. 3. By this means the knotter chassis can be arranged on the hub 18 in a manner in which it can be later released. In the example of embodiment represented, and inasmuch preferred, the hub 18 has the length NL that can be seen in FIG. 2, and thus extends from the one end face of the knotter drive disk 20 beyond the opposite end of the hub 18 of the knotter drive disk 20 and the region of the knotter chassis 12 located in the region of the knotter driveshaft 14.

The knotter drive disk 20, rotating with the knotter driveshaft 14 once through 360° for two knot formations, has on its periphery two radially outward located toothed drive segments 24 for the rotation of the knotter hook 6, and also two radially inward located toothed drive segments 22 for the rotary drive of the twine holder 8, and finally a cam track 26 for two pivotal movements of the blade lever 4 per rotation of the knotter drive disk 20.

The knotter module 30 comprises at least: one twine holder 8 driven by the first toothed drive segment 22 of the knotter drive disk 20, and also one knotter hook 6 driven by the second toothed drive segment 24 of the knotter drive disk 20, whose function and interaction is generally of known art. The knotter chassis 12 carries these two elements of the knotter module 30 on a carrier arm 12A directed radially outwards from the hub 18. In the example of embodiment represented, and inasmuch preferred, this is approximately configured in an L-shape, wherein the shorter L-leg 12A" is oriented approximately at right angles to the longer L-leg 12A', or, if applicable, at a slightly different angle in a direction pointing away from the knotter drive disk 20. This direction forms an acute angle with the knotter driveshaft 14, or runs parallel to it, and carries, mounted in a manner such that it can rotate, the twine holder 8 known per se. In the example of embodiment represented, and inasmuch preferred, an angled gearbox, which transfers the rotation of the drive pinion 8A onto the rotary driveshaft of the twine holder 8 oriented approximately at right angles to the drive pinion 8A, is housed in the carrier arm 12A.

The carrier arm 12A of the knotter chassis 12 also carries the knotter hook 6 and its drive pinion 6A, which meshes with the toothed drive segment 24.

Figure 3:
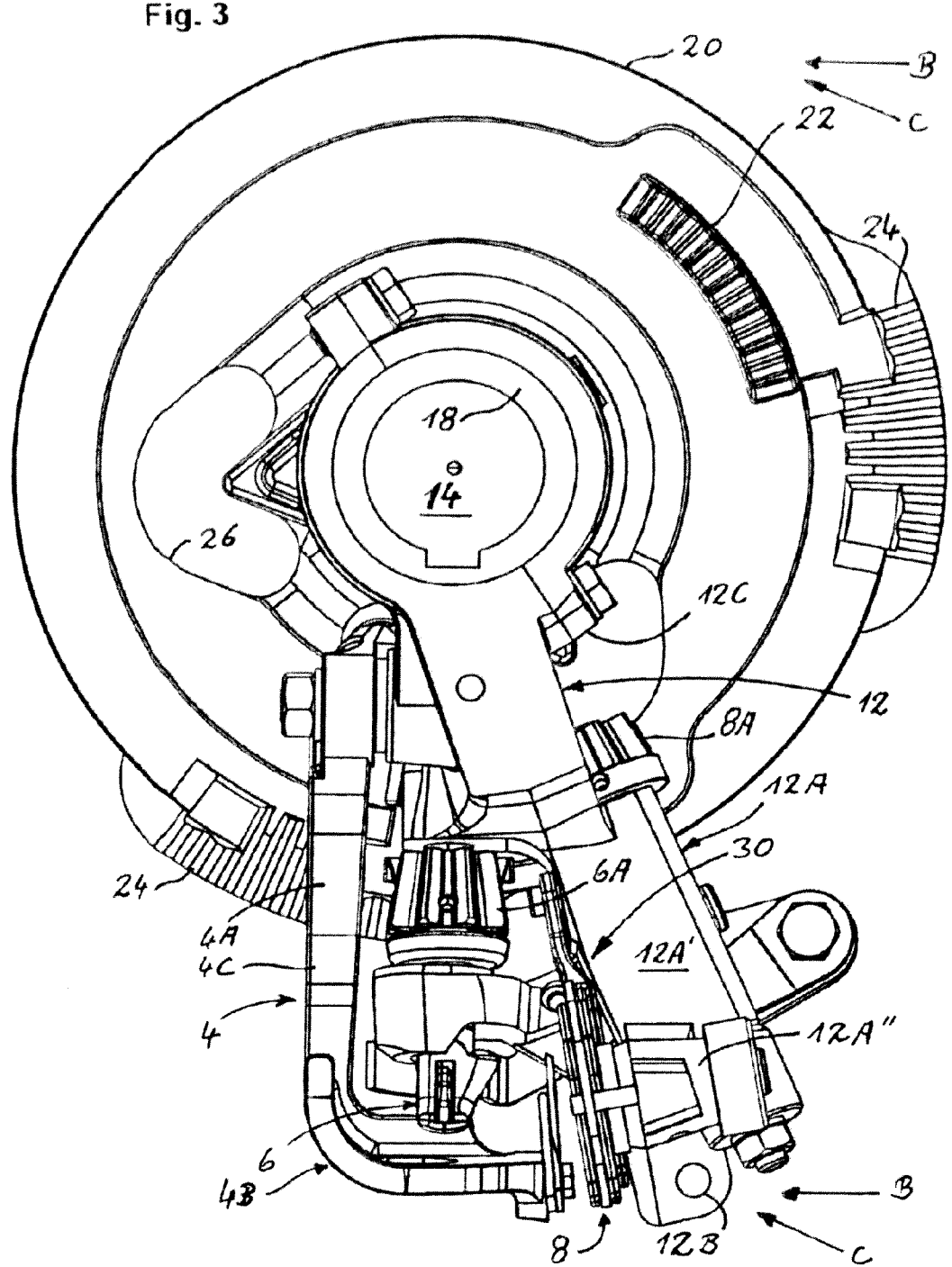
FIG. 3 shows the individual double-knot twine-knotter in FIG. 2 in a (right-hand) end face view (view A-A in FIG. 2)

The knotter chassis 12 also carries the blade lever 4, mounted in a rotary bearing, which extends approximately radially outwards from the knotter driveshaft 14 and, as viewed in the direction of the driveshaft, preferably forms an acute angle with the carrier arm 12A of the knotter chassis 12 (see FIG. 3). In principle an arrangement with the pivot arm 4A in parallel with the carrier arm 12A is also possible. Special features of the blade lever 4 are described further below.

Figure 2:
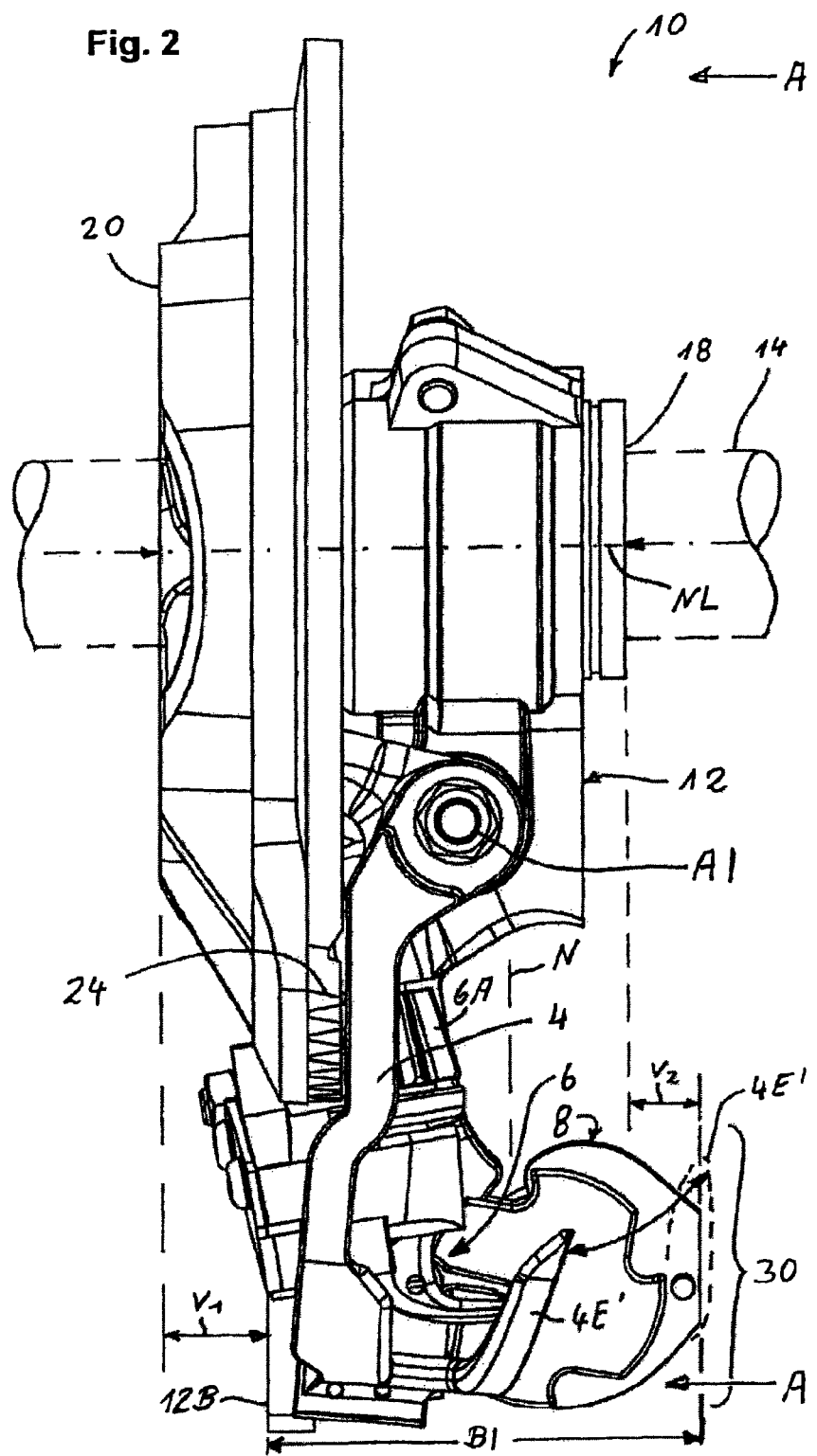
FIG. 2 shows an individual double-knot twine-knotter from the double-knot twine-knotter unit in FIG. 1, viewed from the opposite side.
Figure 4:
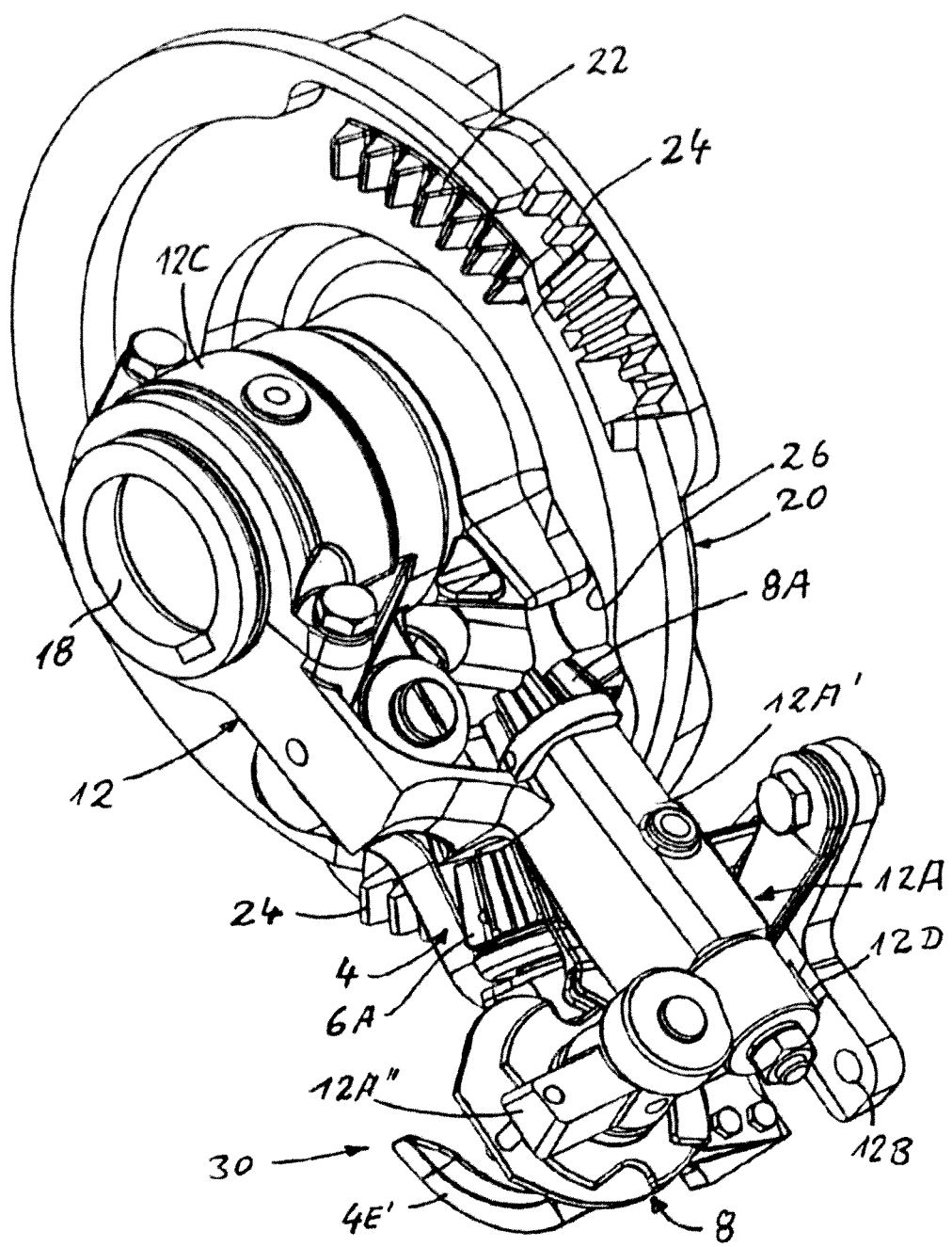
FIG. 4 shows a side view in perspective of the twine-knotter in FIGS. 2 and 3, as viewed from the opposite side to that of the representation in FIG. 2—corresponding to view B-B in FIG. 3.

As can be seen in FIGS. 2 and 4, an approximately C-shaped opening ensues between the driveshaft-side attachment zone of the knotter chassis 12 and the shorter L-leg 12A", in which the twine needle, not represented in the drawing, but known per se, can pivot inwards, approximately parallel to the knotter drive disk 20. The plane of movement traversed by the twine needle for each knot is indicated in both FIGS. 1 and 2 by the line N. The elements of the knotter module 30, arranged next to one another in the axial direction of the driveshaft 14, that is to say, the knotter hook 6 and the twine holder 8, are arranged essentially offset in parallel to the short L-leg 12A" of the carrier arm 12A of the knotter chassis 12. The twine holder 8, approximately in line with the free end of the shorter L-leg 12A" of the knotter chassis 12, thereby forms the end of the double-knot twine-knotter 10 axially located furthermost from the knotter drive disk 20. This end distinctly projects beyond the end of the hub 18 protruding from the knotter drive disk 20 by an offset dimension $V_2$, as can also clearly be seen in FIG. 1. The end of the knotter module 30 located in the opposite axial direction of the driveshaft is also arranged offset from the other end face of the knotter drive disk 20 by an offset dimension $V_1$, that is to say, in the same sense as the offset V. The overall result is that by this means the knotter module is arranged distinctly axially offset with respect to the hub 18, and the twine holder 8 of a double-knot twine-knotter 10 can be arranged distinctly overlapping with the knotter drive disk 20 of the adjacent double-knot twine-knotter, and radially outboard of that adjacent drive disk, as can clearly be understood from FIG. 1. The end of the knotter module 30 located opposite to the twine holder can in particular be formed by the attachment eye 12B of the knotter chassis 12. The latter can be attached to a side arm 12D of the carrier arm 12A, wherein the side arm 12D extends in an approximately opposite direction to the short L-leg 12A" of the carrier arm 12. In this manner the overall maximum width B1 of the module 30, as viewed in the axial direction of the driveshaft, is essentially defined. In the example of embodiment represented, and inasmuch preferred, it is approximately as large as the hub length NL.

The new configuration of blade lever is described in conjunction with FIG. 5 as follows. The blade lever 4, which can be pivoted with respect to the chassis 12 about a shaft A1, is pivotally driven in a conventional manner via a drive lever 4F with the aid of the cam track 26 of the knotter drive disk 20. The pivot arm 4A of the blade lever 4 is, as viewed in the direction of the shaft A1, essentially straight, and has an approximately rectangular cross-section with rounded corners. It consists essentially of a first sub-length 4A' and a second sub-length 4A" at a greater distance from the shaft A1. Between the two sub-lengths is provided a short cranked section 4C, and the two sub-length regions assume an obtuse angle relative to one another that deviates slightly from 180°, so that as viewed in the direction of the shaft A1, sufficient space remains free at the side near the distal sub-length 4A" for the knotter hook 6, as can be seen particularly clearly in FIG. 2. An articulation region 4G inclined at about 45° with respect to the pivot arm 4A, ensures that with, at the same time, sufficient length of the drive lever 4F, the pivot arm 4A comes to rest in its rest-deadpoint position, represented in FIG. 2, as near as possible to the knotter drive disk 20. The working region 4B of the blade lever 4 carrying the twine blade 4D is extended approximately at right angles to the pivot arm 4A, so that an essentially L-shape ensues. The working region 4B also includes a fork-shaped region 4E with a tooth 4E' curved through approximately 90°, by means of which twine guidance tasks, and also a stripper function, are fulfilled with respect to the knotter hook 6. Also in the right-hand side view of the blade lever 4 in FIG. 5, as can be seen from FIG. 3, the pivot arm 4A is straight and the blade lever 4 is formed in an overall L-shape, wherein the shorter L-leg once again forms the working region 4B.

Figure 5:
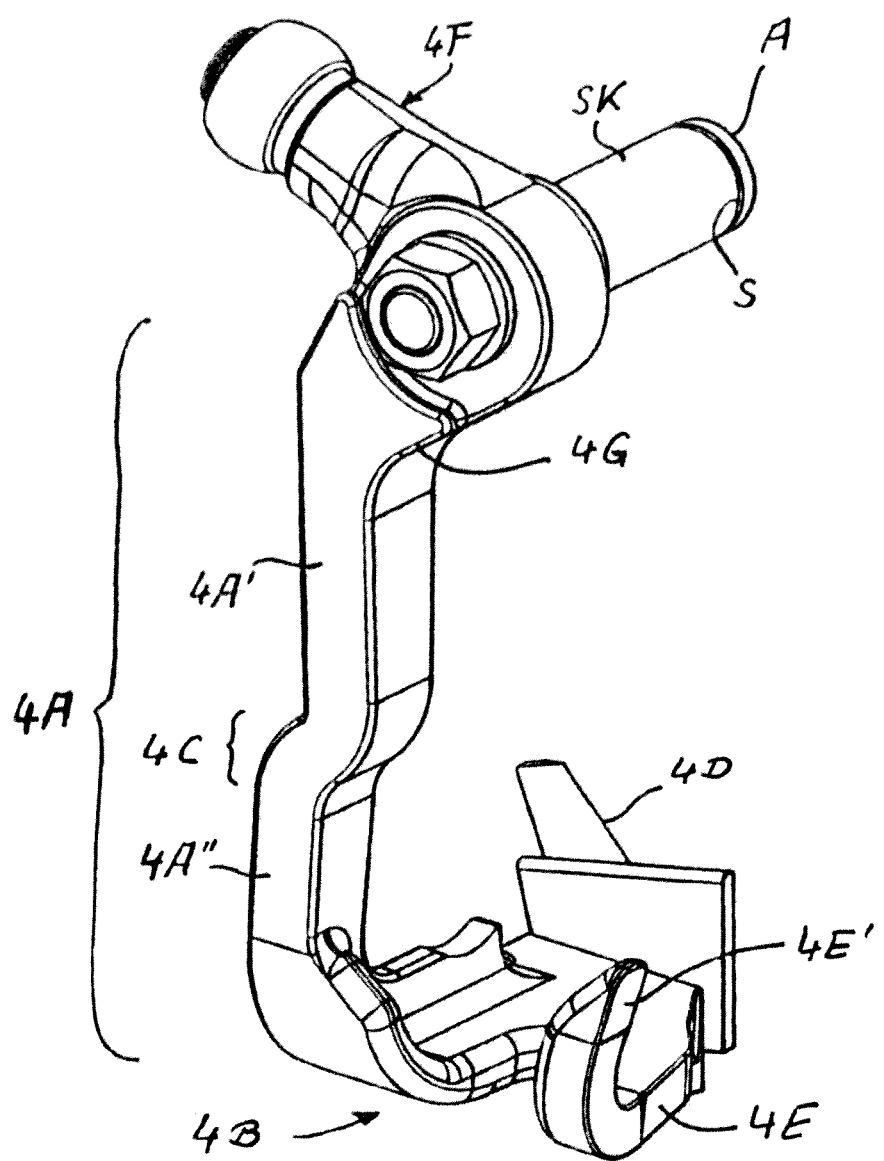
FIG. 5 shows a blade lever, modified with respect to the form of embodiment in FIGS. 1 to 4, in a side view with slight perspective, approximately corresponding to the view in FIG. 2.

The example of embodiment in accordance with FIG. 5 differs from the preceding examples of embodiment in that the fork tooth 4E' is configured in a curved manner, parallel or approximately parallel to the lower sub-length 4A" of the pivot arm 4, and inasmuch is longer than in the preceding examples of embodiment.

In the rest-deadpoint position in FIG. 2 the lower sub-length 4A" extends in the region of the drive disk 20 and radially outboard of the same, while the sub-length region 4A' is located in parallel at the side of the related end face of the drive disk 20. At the same time the working region 4B of the blade lever 4 preferably also does not project into the offset zone $V_1$ of the knotter module 30. On account of the not insignificant reach of the shorter L-leg, that is to say, of the working region 4B of the blade lever 4, the latter, as is represented by a dashed line in FIG. 2, in its maximum outwards pivoted position usually projects beyond the width B1 of the knotter module 30, and thus not laterally beyond the twine holder 8; however, this is not damaging.

Also the arrangement and dimensioning of the drive lever 4F ensures that the deadpoint positions and the pivot region of the working region 4B are correct; ribbing of the pivot arm of the blade lever 4 is totally dispensed with. The complete blade lever is manufactured from a heat-treatable steel alloy, and is preferably partially hardened, in particular with respect to wear of loaded zones, such as twine guides or roller bearings.

In order in the constrained space conditions that prevail between the double-knot twine-knotters mounted on the knotter driveshaft 14, to avoid the need if at all possible for relubrication of the various rotational and pivotal bearings during the so-called journey time of a large bale press, that is to say, between two inspections, provision can be made that all shafts (knotter driveshaft, knotter hook shaft, etc) are grooved and provided with sealing rings S at the respective ends of the bearings. Between the respective shaft and the related hub a bearing clearance is provided, which forms a lubricant chamber between the sealing rings. The chambers are provided with a charge of grease that is more than sufficient for the service life of the knotter. Nevertheless the bearing locations can be provided with lubrication nipples for repair purposes. Such permanent lubrication is of independent inventive significance.

| REFERENCE SYMBOL LIST | |
| --- | --- |
| 1 | Double-knot twine-knotter unit |
| 4 | Blade lever |
| 4A | Pivot arm |
| 4A' | Sub-lengths |
| 4A" | Sub-lengths |
| 4B | Working region |
| 4C | Cranked section |
| 4D | Blade |
| 4E | Fork |
| 4E' | Tooth |
| 4F | Drive lever |
| 4G | Articulation region |
| 6 | Knotter hook |
| 6A | Drive pinion |
| 8 | Twine holder |
| 8A | Drive pinion |
| 10 | Twine-knotter |
| 12 | Knotter chassis |
| 12A | Carrier arm |
| 12A' | L-leg, long |
| 12A" | L-leg, short |
| 12B | Attachment eye |
| 12C | Bearing half shell of the knotter chassis |
| 12D | Side arm |
| 14 | Knotter driveshaft |
| 18 | Hub of the knotter drive disk |
| 20 | Knotter drive disk |
| 22 | Toothed drive segment/twine holder |
| 24 | Toothed drive segment/knotter hook |
| 26 | Cam track |
| 30 | Knotter module |
| A1 | Shaft |
| B1 | Width (of 30) |
| D | Edge separation distances |
| G | Twine loops |
| N | Needle movement plane |
| NL | Hub length/needle separation distance |
| P | Bale press channel |
| RB | Rectangular bale |
| S | Sealing ring |
| SK | Lubricant chamber |
| $V_1$ | Offset dimension 1 |
| $V_2$ | Offset dimension 2 |
| A-A | View |
| B-B | View |
| C-C | View |

The invention claimed is:

1. A double-knot twine-knotter unit designed for use with a large bale press with twine tying with a plurality of double-knot twine-knotters assembled on one knotter driveshaft, in which each double-knot twine-knotter comprises at least one knotter drive disk, one knotter chassis, one knotter module and one blade lever, and in which
the knotter drive disk is attached torque proof on the knotter driveshaft, which can be driven about its axis,
the knotter chassis is assigned to the knotter drive disk such that the knotter chassis is held fixed in space, at one end with respect to a bale press channel, and at the other end by the knotter driveshaft,
the knotter chassis carries a knotter module forming one or two knots, one following another, and also the blade lever, which is driven by a cam track of the knotter drive disk, and
the knotter module comprises at least one twine holder driven from a first toothed drive segment of the knotter drive disk, and also one knotter hook driven from a second toothed drive segment of the knotter drive disk, characterized in that
the knotter module is arranged overall axially offset with respect to the hub of the knotter drive disk and the driveshaft side end of the knotter chassis, so that the knotter module is arrangeably overlapping on a sub-length of the knotter module with the knotter drive disk of the adjacent double-knot twine-knotter in the axial direction of the knotter driveshaft.

2. The double-knot twine-knotter unit as defined in claim 1, wherein a width of the knotter module is defined by the point of the twine holder that is axially furthest from the knotter drive disk.

3. The double-knot twine-knotter unit as defined in claim 1, wherein the knotter chassis, when seen across to the knotter drivershaft, comprising a carrier arm being L-shaped.

4. The double-knot twine-knotter unit as defined in claim 1, including a gearbox for the actuation of the twine holder is integrated in the form of a housing into a carrier arm of the knotter chassis.

5. The double-knot twine-knotter unit as defined in claim 1, wherein the pivot arm of the blade lever is straight.

6. The double-knot twine-knotter unit as defined in claim 5, wherein the pivot arm is arranged parallel or approximately parallel to the knotter drive disk, when it is located in its rest-deadpoint position.

7. The double-knot twine-knotter unit as defined in claim 1, wherein the cross-section of the pivot arm of the blade lever has a polygonal or rectangular cross-section.

8. The double-knot twine-knotter unit as defined in claim 1, wherein the pivot arm of the blade lever has two straight sub-length regions.

9. The double-knot twine-knotter unit as defined in claim 1, wherein the pivot arm of the blade lever has a cranked section.

10. The double-knot twin-knotter unit as defined in claim 5, wherein the pivot arm of the blade lever is angled by 1 to 30°.

11. The double-knot twine-knotter unit as defined in claim 1, wherein the blade lever, having a pivot arm and a working region, is configured in an L-shape, as viewed in the direction of its pivot shaft.

12. The double-knot twine-knotter unit as defined in claim 1, wherein the blade lever, having a pivot arm and a working region, is configured in an L-shape, as viewed in the direction parallel to the knotter driveshaft.

13. The double-knot twine-knotter unit as defined in claim 1, wherein at least one of its rotational or pivotal bearings is provided near to or on the ends of the bearing with sealing rings between hub and shaft, and the chamber that exists as a result of the bearing clearance provided between the sealing rings of a bearing is a lubricant chamber filled with lubricant.

14. The double-knot twine-knotter unit as defined in claim 1, wherein the knotter chassis comprises a carrier arm, said carrier arm having one arm projecting in the axial direction of the knotter driveshaft beyond the hub of the knotter drive disk and the driveshaft-side end of the knotter chassis, and is arrangeable in overlapping manner on a sub-length of the knotter chassis with the build length of the knotter drive disk of the immediately adjacent double-knot twine-knotter.

15. The double-knot twine-knotter unit as defined in claim 1, including at least one shaft for a supporting rotational or pivotal bearing, and wherein in order to reduce a need for relubrication of said rotational or pivotal bearing, said at least one shaft is grooved and provided with sealing rings at respective ends of said bearing, so that a bearing clearance is provided between said respective shaft and said related hub, which clearance forms a lubricant chamber between said sealing rings.

16. A double-knot twine-knotter unit which can be used in association with a large bale press having a plurality of double-knot twine-knotters assembled on at least one knotter driveshaft, each of said double-knot twine-knotters includes a knotter drive disk, a knotter chassis, a knotter module and a blade lever, said knotter drive disk being attached to said knotter driveshaft and is designed to be driven about an axis of said knotter driftshaft, said knotter chassis associated with said knotter drive disk such that said knotter chassis is held fixed in space, and wherein a first one end of said knotter chassis is positioned relative to a bale press channel and a second end of said knotter chassis is positioned relative to said knotter driveshaft, said knotter chassis supporting a knotter module and a blade lever, said knotter module designed to form at least one knot, said blade lever is driven by a cam track of said knotter drive disk, said knotter module including a twine holder and a knotter hook, said twine holder driven from a first toothed drive segment of said knotter drive disk, said knotter hook driven from a second toothed drive segment of said knotter drive disk, said knotter module is arranged to be axially offset with respect to a hub of said knotter drive disk and said driveshaft side end of said knotter chassis so that said knotter module is at least partially overlapping a portion of said knotter module and said knotter drive disk of an adjacently positioned double-knot twine-knotter is in said axial direction of said knotter driveshaft.

17. The double-knot twine-knotter unit as defined in claim 16, including a gearbox for actuation of said twine holder, said gear box at least partially integrated in a housing of said knotter chassis, said knotter chassis includes a L-shaped carrier arm.

18. The double-knot twine-knotter unit as defined in claim 16, wherein a pivot arm is arranged parallel to said knotter drive disk when located in a rest-deadpoint position.

19. The double-knot twine-knotter unit as defined in claim 16, wherein said blade lever including a pivot arm configured in an L-shape.

20. The double-knot twine-knotter unit as defined in claim 16, wherein said knotter chassis includes a carrier arm, said carrier arm having one arm projecting in said axial direction of said knotter driveshaft and beyond said hub of said knotter drive disk and said driveshaft-side end of said knotter chassis, said carrier arm arrangeable in overlapping manner on a portion of said knotter chassis with a build length of the knotter drive disk of the immediately adjacent double-knot twine-knotter, at least one shaft supporting a rotational or pivotal bearing, and wherein in order to reduce a need for relubrication of said rotational or pivotal bearing, said at least one shaft is grooved and provided with sealing rings at respective ends of said bearing, so that a bearing clearance is provided between said respective shaft and said related hub, which clearance forms a lubricant chamber between said sealing rings.

* * * * *